Figure 1:
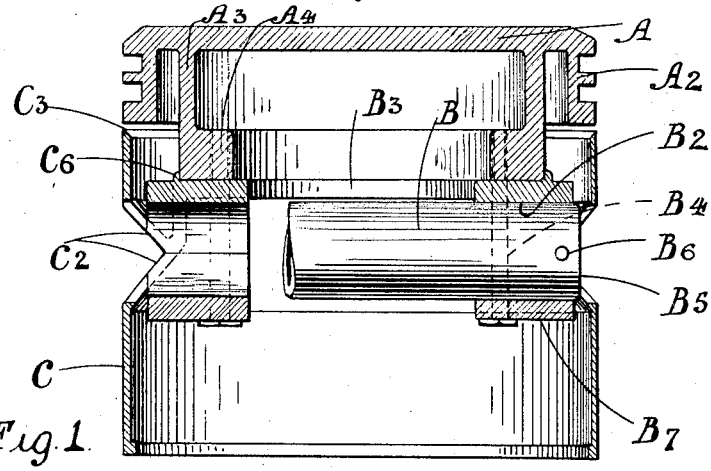

May 12, 1925. 1,537,900

E. TALBOT

PISTON

Filed April 16, 1923  2 Sheets-Sheet 1

INVENTOR
Ernest Talbot
PER
Spear, Middleton, Donaldson & Hull
ATTORNEY

May 12, 1925.

E. TALBOT

PISTON

Filed April 16, 1923

1,537,900

2 Sheets-Sheet 2

INVENTOR
Ernest Talbot
PER
Spear, Middleton, Donaldson & Hall
ATTORNEY

Patented May 12, 1925.

1,537,900

UNITED STATES PATENT OFFICE.

ERNEST TALBOT, OF LOWESTOFT, ENGLAND.

PISTON.

Application filed April 16, 1923. Serial No. 632,511.

*To all whom it may concern:*

Be it known that I, ERNEST TALBOT, a subject of the King of England, residing at Lowestoft, in the county of Suffolk, England, have invented certain new and useful Improvements in Pistons, of which the following is a specification.

This invention relates to pistons of the kind in which the head or part carrying the packing rings is formed separately from the skirt or bearing portion and is subsequently connected to it by a suitable joint. It is the principal object of the invention to provide a construction which will ensure a uniform distribution of the heat to the skirt portion, and will thus avoid local distortion and binding effects in the cylinder, and by permitting a closer fitting therein will minimize or wholly eliminate piston "slap." A further object is to provide an improved construction of the bearings for the piston pin and means for securing the latter in a simple manner so as to prevent its endwise movement in the bearings.

According to this invention, the piston comprises in combination, a head carrying the packing rings and a skirt or equivalent detachably connected therewith through a reduced portion extending from the piston crown, together with a divided bearing for the piston pin.

This divided bearing may be formed separately from the head and the skirt or equivalent, thereby making it possible to machine the whole interior surface of the skirt and the piston because of the absence of irregular projections upon its walls. The bearing so formed may be united to the skirt by the same bolts which connect the latter with the head.

The foregoing arrangement presents a number of important advantages over prior constructions, inasmuch as the bearings may be readily adjusted for wear or slight inaccuracies in size, while if formed separately, stock heads and skirts may be built up with any desired size of piston pin and only the minimum of metal necessary for strength need then be provided in the bearings. As is well known, it is customary in constructing stock pistons with integral bosses for the piston pin, to provide bosses which are large enough for the maximum usual diameter pin, whereby there may be considerable excess metal and weight if a smaller pin is required.

It will be appreciated, however, that the existence in a piston, of irregular projections formed by integrally arranged bosses for the piston pin wholly prevents the machining of the band of metal in which they are located within the piston, and consequently the ordinary piston not only has an undesirable excess of metal in these regions, but also the metal is of irregular thickness, and thus may cause local distortion through temperature effects. Hence, by the present invention, the ability to machine the whole interior of the piston minimizes or wholly avoids these defects.

Furthermore, as will be more fully described hereunder and pointed out in the claims, the construction of the piston is such that the heat flow from the head to the skirt is conveyed in a manner which will ensure an even distribution as to temperature, and is so far minimized in quantity as to avoid distortion and other incidental effects arising therefrom.

The manner of carrying out the invention is illustrated in the accompanying drawings, in which—

Figure 2:
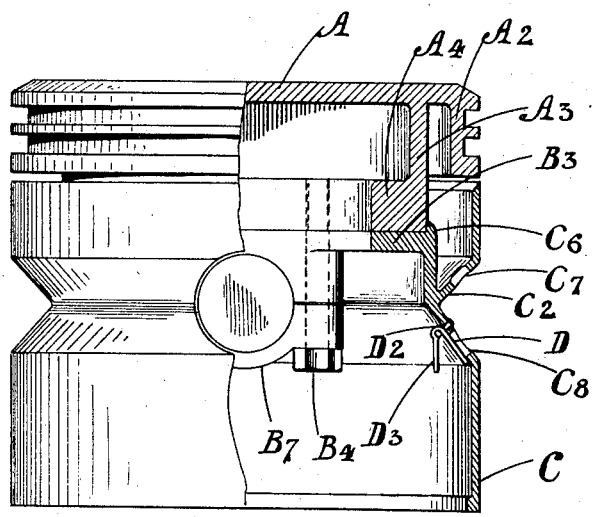
Figure 3:
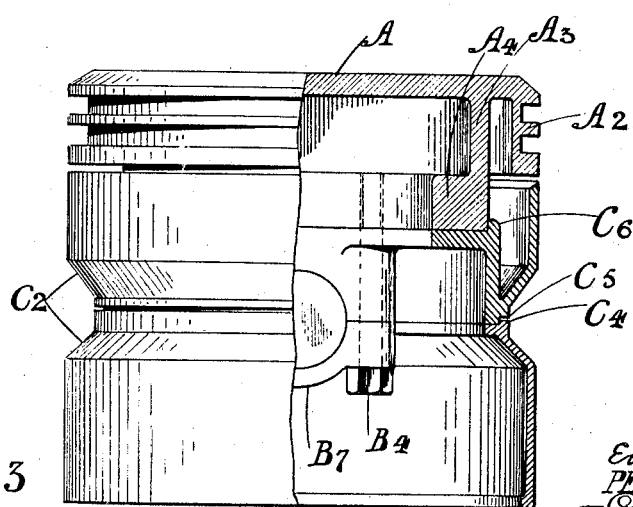
Figure 4:
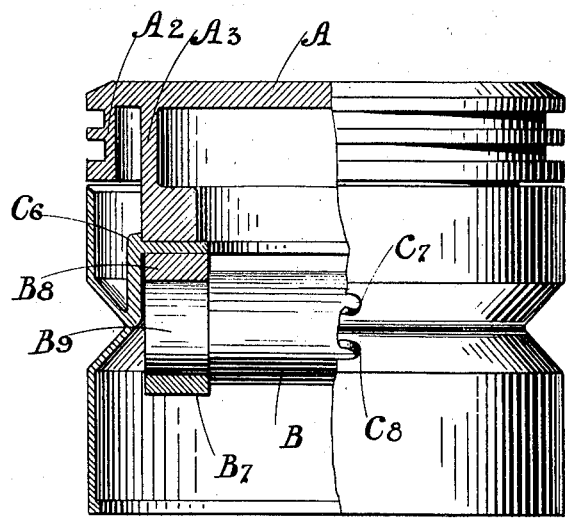
Figure 5:
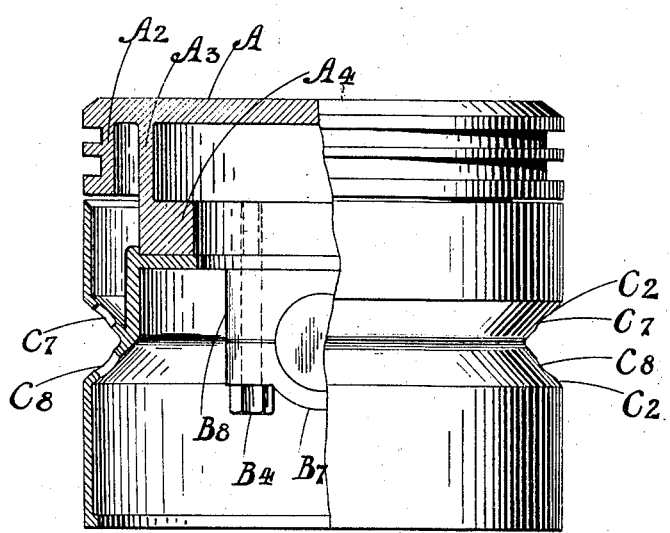

Figures 1 and 2 are respectively a full and part-sectional elevation of one embodiment of the invention, the sectional planes being parallel with the piston pin axis in Figure 1 and at right angles thereto in Figure 2, Figure 3 is a part-sectional view of a modification, and Figures 4 and 5 are part-sectional views of a further modification, the planes of section being as in Figures 1 and 2.

The head portion A is provided with a circumferential flange $A^2$ for the packing rings and also with a hollow tubular portion $A^3$ of a substantially reduced diameter extending from the crown and terminating in a radial flange $A^4$ adjacent the position at which the piston pin B would be located.

The bearing member or rubbing portion is preferably a plain cylindrical portion C having intermediate of its ends a wide and deep circumferential groove $C^2$, preferably of V shape, whose deepest part is in the plane containing the axis of the piston pin B. The interior shape of the rubbing portion follows the shape of this groove so as to provide a uniform thickness of metal and ensure lightness, and as a consequence there is as it were a constriction or reduced part within the bearing surface which constitutes a convenient and secure location not only for the bosses $B^2$ for the piston pin, but also for a flange $B^3$ to connect with the flange $A^4$ on the end of the extension from the piston head.

The bolts $B^4$ by which the two parts A and C are secured together are preferably arranged one on each side of each of the piston pin bosses and thus are four in number. This provides a compact arrangement involving only a minimum of additional metal. The ends $B^5$ of the piston pin are brought into the external V groove $C^2$ in the rubbing portion C, and this enables the pin to be easily secured (as for instance by means of a split pin extending through the hole $B^6$ in the pin) if the latter is of the fixed kind.

The end $C^3$ of the rubbing piece C nearest to the packing rings may be brought as close to the ring-carrying portion as is desirable, and its edge may be sharp, as shown, to scrape off excess oil from the cylinder walls and to lead it to the gudgeon pin bearing.

Where a piston pin is intended to oscillate in the bearings provided in the piston, the foregoing arrangement of the connecting bolts $B^3$ for the two parts lends itself readily to the construction of the bearing bosses $B^2$ in halves, as is shown in each of the several constructions, whereby wear can readily be taken up. This is a construction which is particularly suitable for the pistons of medium size and large engines.

If, therefore, the bearing for the piston pin is divided, this is preferably effected by providing caps $B^7$ which are entirely separate from the rubbing portion C, but alternatively the latter, as shown in Figure 3, may be transversely divided at $C^4$ in the plane of the piston pin axis. If desired, flanges may be provided for uniting the two parts at $C^4$ as well as a registering device $C^5$ of any suitable nature to ensure alignment of the two parts axially of the piston, such a registration device $C^6$ being also provided at the connection of the head part $A^3$ with the rubbing part, as is shown in each of the drawings. The same bolts $B^4$ would serve to unite the divided parts to the head part, but in this case the bearing cap $B^7$ would be formed in one with the adjacent rubbing part.

The advantages of dividing the piston pin bearings by either of the foregoing methods is of great importance from the manufacturing point of view, as if the hole for the piston should be somewhat too large, the error can be rectified in the usual manner, that is, by taking a light cut over the faces at the division of the bearing $B^2$ and the rubbing part C. Furthermore, wear can be taken up in a like manner, and piston pins having ends $B^9$ of a reduced diameter to constitute the journals, can be employed, as shown in Figure 4, thus preventing endwise movement of the pin without the aid of special devices which frequently become loose and cause trouble.

To prevent the oil which is scraped off the cylinder walls from accumulating at the base of the space between the rubbing piece C and the extension $A^3$ from the piston head, holes $C^7$ are provided at or near the lowest part of the space, and the oil can thus flow through them into the circumferential V groove $C^2$ above mentioned. Other holes $C^8$ are also provided in the lower portion of the wall of this groove to allow the oil to drain away to the engine crankcase, or sump. If desired these holes $C^8$ may be provided with baffles or with non-return valves D adapted to prevent oil being splashed through them from the crankcase. Such non-return valves might comprise flap valves formed of thin sheet metal, and hinged at $D^2$ to the piston and lightly pressed against their sealings by a depending portion or pendulum $D^3$ which is displaced laterally when the load on the valve exceeds a certain amount.

In Figures 4 and 5, the foregoing constructions are modified by making the bearings for the piston pin entirely separate from the skirt or equivalent portion. As will be seen, the same bolts $B^4$ will suffice not only to unite the head, skirt, and cap portions as before, but also that part $B^8$ of the bearing to which the cap $B^7$ is attached and which in the other constructions illustrated is integral with the skirt portion C. Obviously the connection of the bearing with the skirt may be strengthened by the employment of dowel pins or an equivalent locating device in addition to the bolts, and the bearings may be bored in the known manner before dividing them.

There are many advantages which arise from this last described construction, inasmuch as the bearings may be renewed simply and inexpensively without having to renew the whole piston, and the same piston castings can be employed to suit different engines in which the piston pin may be of a larger or smaller diameter than that for which the piston was originally designed. For manufacturing purposes this reduces the number of stock parts required and avoids also the necessity for providing in the casting, bosses which are large enough to suit the diameters of the largest pins likely to be employed, whereby there is an excess of metal when only a small pin is used.

An equally important advantage is that the separate formation of the bearings for the piston pin avoids irregular radial projections on the interior surface of the piston, and therefore it may be machined all over internally concentrically with the piston axis, and greater uniformity in the distribution of the metal results. It will follow from this that, within very close limits, all pistons made to a particular pattern will be alike in weight, and the cost and work involved in providing sets of like weight for a multi-cylinder engine are either avoided or considerably minimized.

In all the foregoing examples, the provision of a removable cap for the piston pin bearings makes it possible to enlarge the diameter of the pin between the two bearings so that not only is a larger bearing surface provided but also endwise movement of the pin may be limited or wholly prevented, and the use of separate locking parts which are liable to become loose is avoided.

In each construction of the piston according to this invention, the transfer of heat from the crown of the piston to the skirt or bearing portion is minimized inasmuch as it can only reach these parts by travelling along the extension $A^3$ of the crown through the flange connection at $B^3$, and from there to the waist of the skirt at $C^2$, eventually reaching the surfaces bearing against the walls of the cylinder. As the heat is delivered to the skirt at the apex of the V groove $C^2$, it tends to distribute itself equally to the portions on each side of the groove, whereby extremes of local and excessive heat at one portion and comparative coolness at another portion is avoided, and the fit of the skirt in the cylinder is good under all running conditions.

By this invention an ample bearing surface is provided upon both sides of the gudgeon pin in the axial direction of the piston, and the arrangement is such that the portion nearest to the head is as effectively isolated from it as to heat conduction, as is that part of the bearing surface which is remote from the head. Thus it is possible to make the bearing portion of uniform diameter from end to end instead of progressively reducing it towards the head part. Owing to the ample support thus provided, the external diameter of the ring-carrying part can be reduced sufficiently to prevent the "lands" (i. e., the parts between the packing rings) touching the cylinder walls.

What I claim as my invention and desire to secure by Letters Patent of the United States is:—

1. In a piston for a fluid pressure engine, the combination of a head carrying packing rings, a reduced portion constituting a neck extending from the crown of said head and integral therewith, a skirt directly attached to said neck, and a divided bearing for the reception of a piston pin wholly carried by said skirt, substantially as set forth.

2. In a piston for a fluid pressure engine, the combination of a head carrying packing rings, a reduced portion constituting a neck extending from the crown of said head, a skirt transversely divided to form two parts, a divided bearing for a piston pin, and fasteners adapted to unite collectively to said head the respective parts of said bearing and said skirt, substantially as set forth.

3. In a piston for a fluid pressure engine, the combination of a head carrying packing rings, a reduced portion constituting a hollow neck extending from the crown of said head and integral with it, a skirt attached to said neck, and a divided bearing for a piston pin formed separately from said skirt said neck and said head and thereafter attached to said skirt, substantially as set forth.

4. A piston as specified in claim 3, wherein a register is employed to locate concentrically said head with said skirt and also the two parts of said skirt with one another, substantially as set forth.

5. In a piston for a fluid pressure engine, the combination of a head carrying packing rings and having a smooth interior surface both concentrically and radially a skirt carried by said head also having a smooth interior surface concentrically and radially, and a divided bearing for a piston pin formed separately from said head and said skirt and subsequently secured to said skirt, substantially as set forth.

6. In a piston for a fluid pressure engine, the combination of a head carrying packing rings, a separately formed skirt attached to said head, a divided bearing for the reception of a piston pin carried by said skirt, and a waist constituted by a groove around the skirt of the piston located adjacent the plane of the piston pin, substantially as set forth.

7. A piston as specified in claim 6, wherein the sides of the groove in the skirt of the piston are pierced by holes communicating respectively with the spaces above and below the groove, substantially as set forth.

8. A piston as specified in claim 7, wherein the holes pierced in the sides of the groove are provided with non-return valves with means for loading the valves upon their seatings, substantially as set forth.

In testimony whereof I have signed my name to this specification in the presence of two subscribing witnesses.

ERNEST TALBOT.

Witnesses:
RUSSELL H. RHODES,
R. E. SUGAR.